US010636320B2

(12) United States Patent
Charters et al.

(10) Patent No.: US 10,636,320 B2
(45) Date of Patent: Apr. 28, 2020

(54) MUSICAL INSTRUMENT TUTOR SYSTEM

(71) Applicant: International Business Machines Corporation, Armonk, NY (US)

(72) Inventors: Graham C. Charters, Hampshire (GB); Benjamin T. Horwood, North Perth (AU); Mark A. Shewell, Perth (AU); Bret W. Dixon, South Perth (AU); Alexander H. Poga, Perth (AU)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 15/817,327

(22) Filed: Nov. 20, 2017

(65) Prior Publication Data

US 2019/0156696 A1 May 23, 2019

(51) Int. Cl.
*G09B 15/02* (2006.01)
*G09B 15/00* (2006.01)
*G09B 5/02* (2006.01)
*G06F 16/635* (2019.01)

(52) U.S. Cl.
CPC ........... *G09B 15/00* (2013.01); *G06F 16/637* (2019.01); *G09B 5/02* (2013.01); *G10H 2210/076* (2013.01); *G10H 2210/091* (2013.01); *G10H 2240/131* (2013.01)

(58) Field of Classification Search
CPC ......... G09B 15/00; G09B 5/02; G06F 16/637; G10H 2210/076; G10H 2210/091; G10H 2240/131
See application file for complete search history.

(56) References Cited

U.S. PATENT DOCUMENTS

| 2011/0003638 | A1* | 1/2011 | Lee ........................ G09B 15/00 463/35 |
| 2012/0151344 | A1 | 6/2012 | Humphrey et al. |
| 2014/0041511 | A1 | 2/2014 | Kaipainen et al. |
| 2014/0260903 | A1 | 9/2014 | Stok |
| 2018/0122260 | A1* | 5/2018 | Walder ................. G09B 15/023 |

OTHER PUBLICATIONS

Kageyama, N. "8 Things Top Practicers Do Differently," bulletproofmusician.com, printed Jun. 12, 2017, pp. 1-5. http://www.bulletproofmusician.com/8-things-top-practicers-do-differently/.
Mell et al., "The NIST Definition of Cloud Computing", Recommendations of the National Institute of Standards and Technology, U.S. Department of Commerce, Sep. 2011, 7 pages.

* cited by examiner

*Primary Examiner* — Jianchun Qin
(74) *Attorney, Agent, or Firm* — Timothy J. Singleton

(57) ABSTRACT

A computer system may generate acoustical recommendations for a user. A set of actual acoustical data input may be received and compared with a set of expected acoustical data accessed from memory. The set of actual and expected acoustical data may be corresponding. A set of actual acoustical data vectors may be generated and analyzed against a set of expected acoustical vectors. Deviating portions between the actual and expected may be determined and a set of performance rating vectors may be generated based on each deviating portion. Based on these vectors, and by applying the performance rating vectors to a list of reference ratings, the system can generate a set of acoustical recommendations.

19 Claims, 7 Drawing Sheets

400

405

410

415

MUSICAL INSTRUMENT TUTOR SYSTEM

BACKGROUND

The present disclosure relates to computer systems, and more specifically, to natural language processing-enabled computer systems for learning musical instruments.

Computer-based analysis may be used in creating and recommending music. Software may be used to compose and generate music, and vectors may be used to describe qualities of the music. For example, automated music recommendations may be generated based on artist or song similarity, personalized recommendations, or playlist generations, including particular orders, based on a listener's feedback.

SUMMARY

Embodiments of the present disclosure may be directed toward a system for acoustical data analysis. The system may comprise a memory with a set of computer readable instructions, a set of input devices for receiving acoustical data input, and at least one processor for executing the computer readable instructions. The set of computer readable instructions may be configured to cause the processor to perform a method, which may include receiving a set of actual acoustical data input from an input device in the set of input devices. A set of expected acoustical data may be accessed from memory. The set of expected acoustical data may correspond to the actual acoustical data input. A set of actual acoustical vectors may be generated from the acoustical data input by the least one processor. The set of actual acoustical vectors may then be analyzed against a set of expected acoustical vectors. In response to the analyzing, a set of deviating portions between the actual acoustical vectors and the expected acoustical vectors may be determined and based on the determination, a set of performance rating vectors may be generated for each deviating portion. A set of acoustical recommendations may be generated based on the performance rating vectors and by applying the performance rating vectors to a list of reference ratings.

Embodiments of the present disclosure may be directed toward a method for acoustical data analysis. The method may include receiving a set of actual acoustical data input from an input device. A set of expected acoustical data may be accessed from memory. The set of expected acoustical data may correspond to the actual acoustical data input. A set of actual acoustical vectors may be generated from the acoustical data input by the least one processor. The set of actual acoustical vectors may then be analyzed against a set of expected acoustical vectors. In response to the analyzing, a set of deviating portions between the actual acoustical vectors and the expected acoustical vectors may be determined and based on the determination, a set of performance rating vectors may be generated for each deviating portion. A set of acoustical recommendations may be generated based on the performance rating vectors and by applying the performance rating vectors to a list of reference ratings.

Embodiments of the present disclosure may be directed toward a computer program product comprising a computer readable storage medium having program instructions embodied therewith. The computer readable storage medium is not a transitory signal per se, and the program instructions may be executable by a processor to cause the processor to perform a method including receiving a set of actual acoustical data input from an input device. A set of expected acoustical data may be accessed from memory. The set of expected acoustical data may correspond to the actual acoustical data input. A set of actual acoustical vectors may be generated from the acoustical data input by the least one processor. The set of actual acoustical vectors may then be analyzed against a set of expected acoustical vectors. In response to the analyzing, a set of deviating portions between the actual acoustical vectors and the expected acoustical vectors may be determined and based on the determination, a set of performance rating vectors may be generated for each deviating portion. A set of acoustical recommendations may be generated based on the performance rating vectors and by applying the performance rating vectors to a list of reference ratings.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
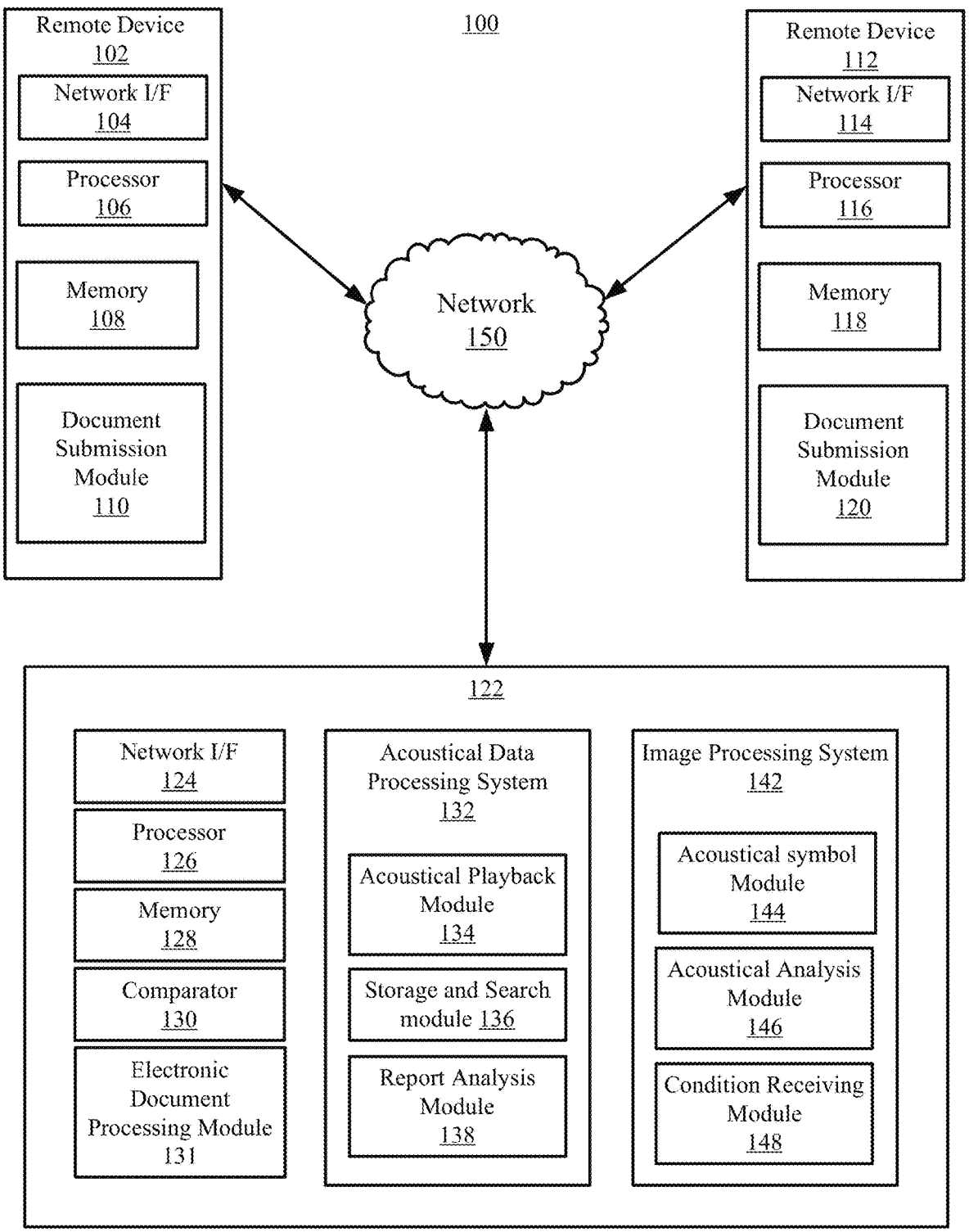
FIG. 1 illustrates a block diagram of an example computing environment in which illustrative embodiments of the present disclosure may be implemented, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a recommender computer system, more particular aspects relate to an acoustical data recommender system. While the present disclosure is not necessarily limited to such applications, various aspects of the disclosure may be appreciated through a discussion of various examples using this context.

Embodiments of the present disclosure may be directed toward a computer system for generating real-time recommendations to a musician based on his practice and performance. A microphone may obtain a set of actual acoustical data and send it to the computer system. For example, a microphone may record a cello player practicing his cello during an individual practice session; the cello player may be practicing "Symphony #2" by Gustav Mahler. The computer system may then access a set of expected acoustical data from memory that corresponds to the set of actual acoustical data. For example, if the actual acoustical data is the first three movements of Mahler's Symphony #2, the computer system may access recordings of Mahler's Symphony #2 from memory. The set of expected acoustical data may be obtained, curated, and refined through any number of process, from music obtained as sheet music, audio recordings, or other formats, as described herein or known in the art. The system may then generate a set of expected acoustical vectors from the expected acoustical data. For example, the set of expected acoustical vectors may describe boundaries of various characteristics of the expected acoustical data. For example, vectors for the expected acoustical data could include tempo, tone, cadence, volume dynamics, or other characteristics. Following the example, the expected vectors could be generated based off the prerecorded and accessed from memory versions of Mahler. Similarly, the computer system may generate a set of actual acoustical vectors from the actual acoustical data. These vectors could represent similar characteristics as the expected vectors. These vectors could be based off the received actual data. For example, the computer system could generate a set of vectors to describe the individual practice session for the cellist, obtained by the microphone.

The computer system could then analyze the vectors generated from the actual acoustical data (i.e., actual acoustical vectors) by comparing them against the expected acoustical vectors. For example, the computer system could determine that the first four measures of the first movement and the final five measures of the third movement deviated from the expected data. Based on the analysis, portions of the actual acoustical data that varied from the expected acoustical data could be identified, and a performance rating vector could be generated for each deviating portion. For example, the rating could include a number to indicate an overall variance from the expected acoustical data (e.g., an overall score of the cellist's practice run). Finally, the computer system could generate an acoustical recommendation by applying the performance rating vector to a list of reference ratings. For example, a list of reference ratings could include correspondence between a particular score and a set of one or more practice pieces. In embodiments, a particular score could reflect a near-mastery of the piece, and result in the computer system automatically recommending the cellist slow down the tempo of the particular measures and practice them repetitively a dozen times. In other embodiments, a score could indicate a large deviation from the expected, and the computer system could recommend a completely different piece of music for the cellist to practice, which includes stylistic similarities and shares a same set of skills needed, but is a much simpler piece or arrangement. In other examples, for example, when a musician has reached near-mastery of a piece, but is still struggling with a small passage, the system could provide other exercises in a similar style of that small passage, in order facilitate mastery of the small passage, and thus the piece as a whole. In this way, the system can generate recommendations to the user based on his current level of skill, and evolve the practice recommendations as the musician develops his skill.

Recommender systems allow a computer to analyze information and create recommendations based on data input. The recommender system can characterize patterns and similarities of different inputs and infer probable decisions based on patterns of the data input.

Aspects of the present disclosure relate to adaptive computing. In some embodiments, the adaptive computing is distributed adaptive computing. Adaptive computing system can include a corpus (database) including adaptive components. In some embodiments, the adaptive components can be managed by one or more content providers. In some embodiments, the corpus includes data for acoustical data processing. In some embodiments, the corpus includes data for acoustical recommendations. In some embodiments, the corpus is a distributed corpus. For example, the distributed corpus can include information useful for an adaptive acoustical recommender system for one or more users. In some example embodiments, the user is a student receiving musical instruction. While the present disclosure is not necessarily limited to such applications, various aspects of the disclosure may be appreciated through a discussion of various examples using this context.

Adaptive computing systems (ACS) can include adaptive acoustical computing systems (AACS). AACS refer to a category of technologies that can combine acoustical (music) processing, machine learning, and a recommender engine, to enable computers to receive acoustical input from a user and automatically process input to automatically generate recommendations to a user. An AACS may use arrays of machine learning tools, including, for example, pattern recognition, hypothesis generation, evidence gathering and scoring, content filtering, and a recommender system, to draw on an available corpus of data to generate insights and solutions addressing inquiries obtained by the AACS. The corpus of the AACS may be an internal representation (such as internal to the ACS) of the body of knowledge available to the AACS. A corpus may include content covering areas that the AACS is designed to address (e.g., data, acoustical input, an acoustical database of original music, and acoustical input from one or more users). The content may be supplied by disparate entities (e.g., content providers) that may produce and maintain content repositories, and who may have an interest in the AACS. Content that is ingested into the corpus of the AACS may be used by the AACS to provide responses to inquiries directed at topics covered by the content. For example, content that might be appropriate for a user that has been practicing music for 20 years would likely be different than content that might be appropriate for a user who has been practicing music for a month.

Embodiments of the present disclosure are directed towards systems, methods, and computer program products for operating an adaptive computing recommender system where the corpus, including adaptive components, are automatically managed by content providers. Content topics are included in the corpus. A content topic may be any subject matter which a corpus of an AACS has content to address or support, such as acoustical data input, acoustical vectors, etc. In some embodiments, the AACS can be a distributed or decentralized AACS. In some embodiments, the AACS may further include classifying inquiries into one or more content topics. Some embodiments also include identifying adaptive workers, associated with disparate content provider's content, which are enabled to address inquiries directed to at least one of the content topics. Each of the modules may be an "adaptive worker" (e.g., a one or more computing nodes with associated software applications for performing a unit of work on behalf of the distributed AACS). As used herein, a node may be a single computer, or a cluster of networked computers configured to perform one or more tasks. A unit of work may include generating answers to inquiries received by the distributed AACS. For example, a user's personal computer can be an adaptive worker.

In one example embodiment, a user's acoustical input is modeled. The model is analyzed and the computer generates a recommendation based on features determined in that model.

Some embodiments may further include distributing the inquiry to the adaptive workers for processing. Responsive to receiving a set of responses from the adaptive workers, embodiments may aggregate said responses.

In one example embodiment, a recommender system, such as an acoustical recommender system, might instruct a computer to assign an expected acoustical data input (e.g., a musical arrangement) to a user to practice and play in preparation for a lesson or following a lesson. The lesson might be at some later time, such as a week later, or may have been at some earlier time, such as the week prior. In embodiments, an instructor may be able to guide personalized hands-on instruction for a student during a lesson, but may be unable to provide detailed practice instruction between lessons. An adaptive recommender computer system, in this example embodiment, may be able to obtain acoustical data input from each practice, analyze that input, and generate recommendations from that analysis. The recommendation could be responsive to the practice style and learning rate of the student. The adaptive recommender computer system could provide the user with a recommendation (e.g., a recommend pattern of practice) that could allow the user to practice and learn more effectively. The adaptive recommender computer system could then adapt to changes in the user's patterns of input to automatically generate respective recommendations to output to a user. For example, once a user has mastered a particular portion of the composition, the recommendation system may modify recommendations to account for the user's new learning.

In embodiments, AACS may include both acoustical processing and machine learning adaptive components. The acoustical processing components may receive an acoustical input from, for example, a user, and process the received input into internal representations (such as a recommendation, actual acoustical data inputs, or expected acoustical data inputs, etc.) that may be receivable by the adaptive components. In some embodiments, the expected acoustical data input can be of any format such as musical instrument digital interface (MIDI), WAV, MP3, or any other format that could create an expected acoustical data input of the acoustical data that would allow for the analysis of that data. For example, the expected acoustical data input can be converted to a set of vectors, as described herein.

As used herein, a musical "piece" may refer to a piece of music, while a "passage" may refer to a section of the piece of music. Each vector in the set of acoustical vectors may define a boundary of at least one aspect of the acoustical data. Such boundaries can include thresholds related to acoustical data input (e.g., user musical playback practice). For example one vector can be tempo deviation. Another vector can be the number of times a particular expected acoustical data input is received (e.g., a number of times a particular passage was received by the system prior to the creation of the vectors, which could indicate the difficulty or precision required in the particular passage). Another vector could be the number of times a particular actual acoustical data was received by the system (e.g., a number of times a passage was played by a person practicing the music, which could indicate a proficiency level of the person practicing). Other vectors could include other aspect of the musical composition, including dynamics, note accuracy, style, tone, and others. Comparing the vectors generated from the actual and expected acoustical data inputs would also allow the AACS to individually parse and compare features of acoustical data input received by the AACS from the users.

The adaptive components may interface with a corpus of the AACS to generate hypotheses, collect evidence in support of the hypotheses, and then score (e.g., rank) the hypotheses and evidence according to the level of confidence the AACS has in each hypothesis. A hypothesis generated by the adaptive components may be prediction at the answer to an inquiry. Evidence in support of a hypothesis may include facts, data patterns, or other data available in the corpus. Scoring may include the process of ranking hypotheses and evidence according to their weight. In some embodiments, the weight can depend on the amount of support available for each content topic. In some embodiments, the weight can depend on the quality of particular instances of support available for each content topic.

Embodiments of the present disclosure are directed towards architecture for a distributed AACS that can be partitioned into an adaptive controller and a plurality of modules. The adaptive controller may include the musical processing components of the distributed AACS as well as components for classifying and distributing inquiries to adaptive workers. The adaptive controller may further include components for receiving and merging responses from adaptive workers. An adaptive worker may be managed by a content provider, and may include the adaptive components of the distributed AACS. An adaptive worker may provide the distributed AACS an interface to a corpus addition generated from the content hosted by a managing content provider. As a corpus receives data from adaptive workers, the corpus can be described as a virtual (or distributed) corpus. For example, a plurality of musicians who access the AACS can make contributions to the virtual corpus when they submit actual acoustical data input (musical practice sessions) for processing. The content providers may regulate access to the adaptive workers, and hence, access to the corpus (or a portion of the virtual corpus) derived from content owned by a content provider.

Collectively, a set of distributed adaptive workers may form the virtual corpus managed by an adaptive controller. The adaptive controller may provide a single interface to receive, classify, and distribute inquiries to the adaptive workers of the virtual corpus. Additionally, the adaptive controller may aggregate responses from the virtual corpus and provide a single interface for returning results to inquiries. The adaptive workers of the virtual corpus may perform the tasks of hypotheses generation, evidence gathering, and scoring. For example, as more adaptive workers (musician's personal computers) are connected and make musical contributions to the AACS, the probability for accurate musical teaching strategies generated by the AACS may be increased.

As discussed above, aspects of the disclosure may relate to acoustical data processing. Accordingly, an understanding of the embodiments of the present disclosure may be aided by describing embodiments of acoustical data processing systems and the environments in which these systems may operate.

Turning now to the figures, FIG. 1 illustrates a block diagram of an example computing environment 100 in which illustrative embodiments of the present disclosure may be implemented. In some embodiments, the computing environment 100 may include at least two remote devices 102 and 112 and a host device 122.

Figure 5:
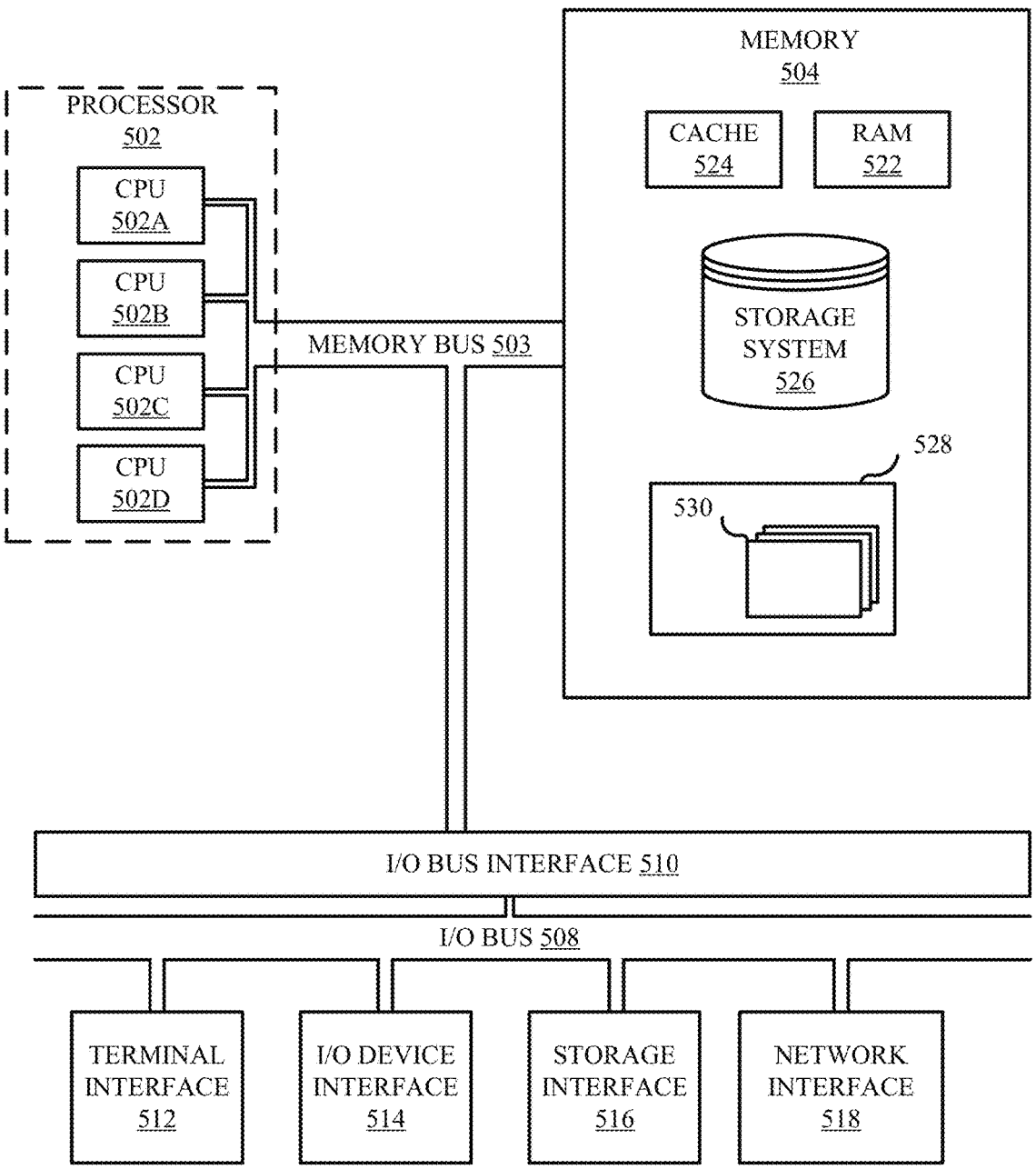
FIG. 5 is a block diagram illustration of a computer system, according to some embodiments.

According to embodiments, the host device 122 and the remote devices 102 and 112 may be computer systems. For example, computer system 501, as shown in FIG. 5, is an example computer system. The remote devices 102 and 112 and the host device 122 may include one or more processors 106, 116, and 126 and one or more memories 108, 118, and 128, respectively. In some embodiments, any of memories 108, 118, and 128 may be configured to include a set of instructions to execute process 200 or 300, of FIGS. 2 and 3, respectively. In some embodiments, processors 106, 116, and 126 may be configured to execute any of the steps of process 200 and/or 300, of FIGS. 2 and 3, respectively. The remote devices 102 and 112 and the host device 122 may be configured to communicate with each other through an internal or external network interface 104, 114, and 124. The network interfaces 104, 114, and 124 may be, for example, modems or network interface cards. The remote devices 102 and 112 and/or the host device 122 may be equipped with a display or monitor. Additionally, the remote devices 102 and 112 and/or the host device 122 may include optional input devices (e.g., a keyboard, mouse, scanner, or other input device), and/or any commercially available or custom software (e.g., browser software, communications software, server software, music processing software, search engine and/or web crawling software, filter modules for filtering content based upon predefined parameters, etc.). In some embodiments, the remote devices 102 and 112 and/or the host device 122 may be servers, desktops, laptops, or hand-held devices.

The remote devices 102 and 112 and the host device 122 may be distant from each other and communicate over a network 150. In some embodiments, the host device 122 may be a central hub from which remote devices 102 and 112 can establish a communication connection, such as in a client-server networking model. Alternatively, the host device 122 and remote devices 102 and 112 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In some embodiments, network 150 can be represented by cloud 50, shown in FIG. 6. In certain embodiments, the remote devices 102 and 112 and the host device 122 may be local to each other, and communicate via any appropriate local communication medium. For example, the remote devices 102 and 112 and the host device 122 may communicate using a local area network (LAN), one or more hardwire connections, a wireless link or router, or an intranet. In some embodiments, the remote devices 102 and 112 and the host device 122 may be communicatively coupled using a combination of one or more networks and/or one or more local connections. For example, the first remote device 102 may be hardwired to the host device 122 (e.g., connected with an Ethernet cable) while the second remote device 112 may communicate with the host device using the network 150 (e.g., over the Internet).

In some embodiments, the network 150 can be implemented within a cloud computing environment, or using one or more cloud computing services. For example, in some embodiments, network 150 can be cloud computing environment of FIG. 6. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote devices 102 and 112 may enable users to submit (or may submit automatically with or without user input) electronic documents (e.g., actual acoustical data inputs, and expected acoustical data inputs, or sheet music that represents expected acoustical data input, etc.) to the host device 122 to identify potential problems in the expected acoustical data input, for a particular user. Sheet music is understood to be symbolic representation of an acoustical arrangement annotated on a digital display or on a physical device such as a sheet of paper, book, and/or chalkboard/whiteboard. For example, the remote devices 102 and 112 may include electronic document submission modules 110 and 120 and a user interface (UI). The electronic document submission modules 110 and 120 may be in the form of a web browser or any other suitable software module, and the UI may be any type of interface (e.g., command line prompts, menu screens, graphical user interfaces). The UI may allow a user to interact with the remote devices 102 and 112 to submit, using the document submission modules 110 and 120, musical data, including acoustical arrangements to the host device 122. In some embodiments, remote devices 102 and 112 include an input device such as a microphone and/or a digital interface device (e.g., MIDI).

In some embodiments, the host device 122 may include an acoustical data processing system 132. In some embodiments, the acoustical data processing system 132 converts musical audio files to a digital form and processes comparisons between user input digital forms against expected acoustical data inputs. The acoustical data processing system 132 may include an acoustical playback module 134, a storage and search module 136, and a report analysis module 138. The acoustical playback module 134 may include numerous subcomponents, such as a tokenizer, or other relevant subcomponents. The storage and search module 136 may include an expected acoustical data input database.

The storage and search module 136 may be implemented using a conventional or other search engine, and may be distributed across one or multiple computer systems. The storage and search module 136 may be configured to store actual acoustical data inputs (e.g., musical audio performances) that are played by users, and processed by the acoustical data processing system 132 to convert them to an actual acoustical vector, before finally storing the actual acoustical vector in a database. These actual acoustical vectors can be grouped and categorized, so that users can be rated and grouped, so that the skills of users with fewer or less refined skills (e.g., students) can be compared with performance of those with greater or more refined skill (e.g., experts or teachers), and recommender strategies can be generated. The storage portion of the storage and search module 136 is a database or repository of acoustical data. The acoustical data can include actual or expected acoustical data input that has been played, recorded, submitted, and/or stored. In some embodiments, the acoustical data can be an acoustical arrangement that has been analyzed by the image processing system 142, converted to expected acoustical data input and stored by the storage and search module 136. The storage and search module 136 may be configured to search one or more databases or other computer systems for content that is related to an electronic document (such as acoustical arrangement) submitted by a remote device 102, which has been converted to expected acoustical data input.

For example, the storage and search module 136 may be configured to include musical dictionaries, papers, and/or archived musical sheet music. These different forms of media can be converted by the acoustical data processing system 132 and image processing system 142, to an expected acoustical data input, and further to a set of expected acoustical vectors. This set of expected acoustical vectors can be used to help identify a condition, and criteria associated with the condition, in the actual acoustical data input from a user. In some embodiments, the storage and search module 136 includes an actual acoustical data input database for storing acoustical (musical) input from users that has been converted to actual acoustical vectors by the acoustical data processing system 132, as well as expected acoustical data input and corresponding sets of expected acoustical vectors, generated from sheet music or other sources.

In another example embodiment, a user can play a few bars of an expected acoustical data input (e.g., an acoustical arrangement) and have his performance uploaded by his personal computer running the AACS (e.g., remote device 102 or 112) to the host device 122. Similarly, one or more other users may do the same with the same acoustical arrangement (i.e., play a few bars of the piece (e.g., a passage) and have it uploaded by a computer running the AACS). These musical performances can be processed by the acoustical data processing system 132 and converted to actual acoustical data input. The actual acoustical data input generated by the users' can then be analyzed against the expected acoustical data input of the music by the report and analysis module 138. The report generated by this can then be analyzed and used to identify conditions and criteria associated with conditions. The report analysis module 138 may be configured to analyze an acoustical arrangement to identify a condition (e.g., times a bar was practiced, tempo deviation, and cumulative errors) and a criterion (e.g., the error index). The report analysis module 138 may include one or more modules or units, and may utilize the storage and search module 136, to perform its functions (e.g., to determine a condition and a criterion).

In an example embodiment, a rating system can be employed to increase the efficiency of the musical teaching disclosed herein. In some embodiments, users can be rated based on their ability to play certain pieces of music or certain passages of a particular piece or style of music within a certain threshold of accuracy and precision. In some embodiments, the rating system can be similar to the Elo rating system that is used in chess rating. Users (musicians) that are within the same 100 series bracket can be grouped, and both performances and improvement trend statistics can be compared between users and even predicted based on performance. Grouping of musicians can increase the relatability and applicability of a recommendation generated and given between users in a particular grouping. For example, users of a similar musical skill may have similar areas of needed practice and improvement. Grouping users also increases the applicability of errors made by users. For example, an error made by a 2000 rated user is going to be very different than an error made by a 100 rated user. In one example embodiment, a user can begin the acoustical recommendation with a rating of 100. He or she can practice the computer generated acoustical recommendation, where the AACS can generate recommendation (e.g., a list of music that can be practiced by the user to reach a desired skill level or rating, a particular measure or set of measures to be practiced, a particular order to practice the music, other recommendations, or a combination of any of these recommendations).

In one example embodiment, by applying the acoustical recommendation, the user might improve from a 100 rating to a 300 rating in 4 weeks. By analyzing the acoustical recommendation assigned to a user by the computer, predictions can be made regarding whether other users can follow a similar projected increase in skill if they follow a similar program of similar intensity. As more and more users are assigned a similar acoustical recommendation and experience a similar trend in improvement, the confidence level of a particular acoustical recommendation can be increased.

In some embodiments, the host device 122 may include an image processing system 142. The image processing system 142 may be configured to analyze written acoustical data. For example, the image processing system 142 can be configured to analyze an acoustical recommendation to create an image analysis. The image analysis may include an image condition and an image criterion present in the musical images determined by the image processing system 142 (e.g., a piece of sheet music can be analyzed by the image processing system to generate an expected acoustical data input).

The image processing system 142 may utilize one or more models, modules, or units to perform its functions (e.g., to analyze an acoustical arrangement image and generate an image analysis). For example, the image processing system 142 may include one or more image processing modules that are configured to identify specific conditions (e.g., notes, dynamics, tempo, etc.) in a musical image. For example, the image processing modules may include an acoustical symbol module 144 to analyze musical notation images and other symbols in an acoustical arrangement to identify the presence, type, and location of musical notation or other symbols. For example, musical notes can include, eighth notes, quarter notes, half notes, whole notes, and their counterpart rests, etc. Other symbols can include staff lines, clefs, tempo definitions, key signature, intensity notation, etc. In some embodiments, the image processing system can be configured to identify the clef of a staff in a sheet music arrangement. As another example, the image processing system 142 may include an acoustical analysis module 146 to identify the tempo and intensity of the playback of an expected or actual acoustical input. In some embodiments, tempo can be indicated on sheet music and the image processing system 142 can be configured to define the tempo accordingly (e.g., by reading the metronome marking on the sheet music).

In some embodiments, the image processing models may be implemented as software modules. For example, the image processing system 142 may include an acoustical symbol module 144 and an acoustical analysis module 146. For example, the image processing system 142, including the acoustical symbol module 144, may process images including electronic images of printed/sheet music. The sheet music could be generated by a musical score writer (as described herein), written by hand, or created in some other way. In some embodiments, a single software module may be configured to analyze the image(s) using the image processing models. For example, in some embodiments, a user can import their own expected acoustical data input to be used in the recommendation process. For example, the image processing system 142 can be configured to convert sheet music into an expected acoustical data input. The expected acoustical data input of the music can be used by the process 200 and 300, of FIGS. 2 and 3, respectively, during the recommendation process (e.g., for instruction, playback output, and analyzing actual acoustical data input progress.)

In some embodiments, the image processing system 142 may include a condition receiving module 148. The condition receiving module 148 may be configured to receive, from the acoustical data processing system, a condition which has been determined by analyzing acoustical data. The condition receiving module 148 may then determine which modules within the image processing system 142 (e.g., the acoustical symbol 144 and the acoustical analysis module 146) should be used to analyze the received acoustical data input. For example, the acoustical data processing system 132 may identify, from an actual acoustical data input, that a user has a specific deficiency in their skillset. Expected acoustical data input may be accompanied by an actual acoustical data input example, (e.g., from a user's practice sessions). Accordingly, the condition receiving module 148 may determine that the image analysis should be generated using the acoustical symbol module 144, instead of, e.g., the acoustical analysis module 146. In some embodiments, conditions can include qualities of an actual acoustical data input.

In one example embodiment, the image processing system 142 or acoustical data processing system 132, can generate acoustical vectors from acoustical data input. Specifically, in this example, the acoustical data processing system 132 can generate actual acoustical vectors from actual acoustical data input. The image processing system 142 or acoustical data processing system 132 can generate expected acoustical vectors from expected acoustical data input. In some embodiments, the acoustical data processing system 132 can generate a set of acoustical performance rating vectors for each portion of reach respective actual acoustical data input that deviates from the corresponding expected acoustical data input.

In some embodiments, musical sheet music is processed with a musical score writer program (e.g., Sibelius®). According to embodiments, a file could be received from a musical score writer program at an electronic document processing module 131. In embodiments, the electronic document processing module 131 could receive files from the musical score writing program in formats including electronic data interchange format (EDIF), PDF, or other format. The files can then be processed as described herein, in a manner similar to the image processing system 142. In other embodiments, output from a musical score writer program may be processed by a different module illustrated at FIG. 1, or by a module not depicted.

In embodiments, the image processing system 142 can use optical character recognition (OCR) of the sheet music and automatically generate a digital form of the music. For example, in some embodiments the digital form of the music can be used as reference and an algorithm for analyzing music such as a Fourier transform can be used to compare the waveform of the expected acoustical data input of the acoustical arrangement against a performed version of the acoustical arrangement to calculate a performance rating. This performance rating may be a percentage or coefficient that describes, depending on the parameters selected, how closely the performance was with the expected acoustical data input, for example a digital waveform of the expected acoustical data input can be compared with a Fourier transform with the digital form of the performed practice session and the difference or divergence between the two waveforms can be equated to a number based on a number of factors. Factors that can affect the performance rating can include tempo deviation, errors, etc.

A musical score writer program is understood to be a computer software program for creating, editing, and generating/printing sheet music. In some embodiments a score writer can convert recorded audio into an expected acoustical data input. In some embodiments, a score writer can convert recorded audio into an expected acoustical data input format such as MIDI. In some embodiments, a score writer can generate sheet music from an expected acoustical data input.

In some embodiments, the host device 122 may include a comparator 130. The comparator 130 may be configured to receive an acoustical data input from an expert performance (e.g., expected data input) and an image analysis from the image processing system 142. The comparator 130 may be further configured to compare the image analysis to the condition and to the criterion to determine whether there is a potential problem with the acoustical recommendation (e.g., if the recommendation was based off of an improper analysis of the image, for example, the sheet music). In response to determining that the report contains an error, the comparator may be configured to notify the remote device 102 or 112 that transmitted the acoustical data to the host device 122. In some embodiments, the comparator 130 can compare acoustical data input received by a user or a plurality of users to create an acoustical model. In some embodiments, the acoustical model can compare the actual acoustical inputs of a plurality of users with the expected acoustical data input. The comparison may then be used to make acoustical recommendations, as discussed herein.

In some embodiments, the host device may have an OCR module. The OCR module may be configured to receive an acoustical notation from the remote devices 102 and 112 and perform optical character recognition (or a related process) on the acoustical arrangement to convert it into an expected acoustical data input. In some embodiments, the OCR module is coupled to the image processing system. For example, the first remote device 102 may transmit an image of a scanned acoustical arrangement (e.g., sheet music) to the host device. The OCR module may convert the image into an expected acoustical data input, and then the expected acoustical data input may be sent to the acoustical data processing system 132 for analysis (e.g., conversion to the set of expected acoustical vectors and/or comparison with the set of actual acoustical vectors). In some embodiments, the OCR module may be a subcomponent of the acoustical data processing system 132. In other embodiments, the OCR module may be a standalone module within the host device 122. In still other embodiments, the OCR module may be an input device located on the remote devices 102 and 112 and may perform OCR on the acoustical arrangements before they are sent to the host device 122. In some embodiments, the OCR module can be configured to read sheet music.

While FIG. 1 illustrates a computing environment 100 with a single host device 122 and two remote devices 102 and 112, suitable computing environments for implementing embodiments of this disclosure may include any number of remote devices and host devices. The various models, modules, systems, and components illustrated in FIG. 1 may exist, if at all, across a plurality of host devices and remote devices. For example, some embodiments may include two host devices. In some embodiments, the host device can be computer system 501 and/or any of nodes 10 at FIG. 6. The two host devices may be communicatively coupled using any suitable communications connection (e.g., using a WAN, a LAN, a wired connection, an intranet, or the Internet). In some embodiments, the connection can be the cloud computing environment depicted at in FIG. 6.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
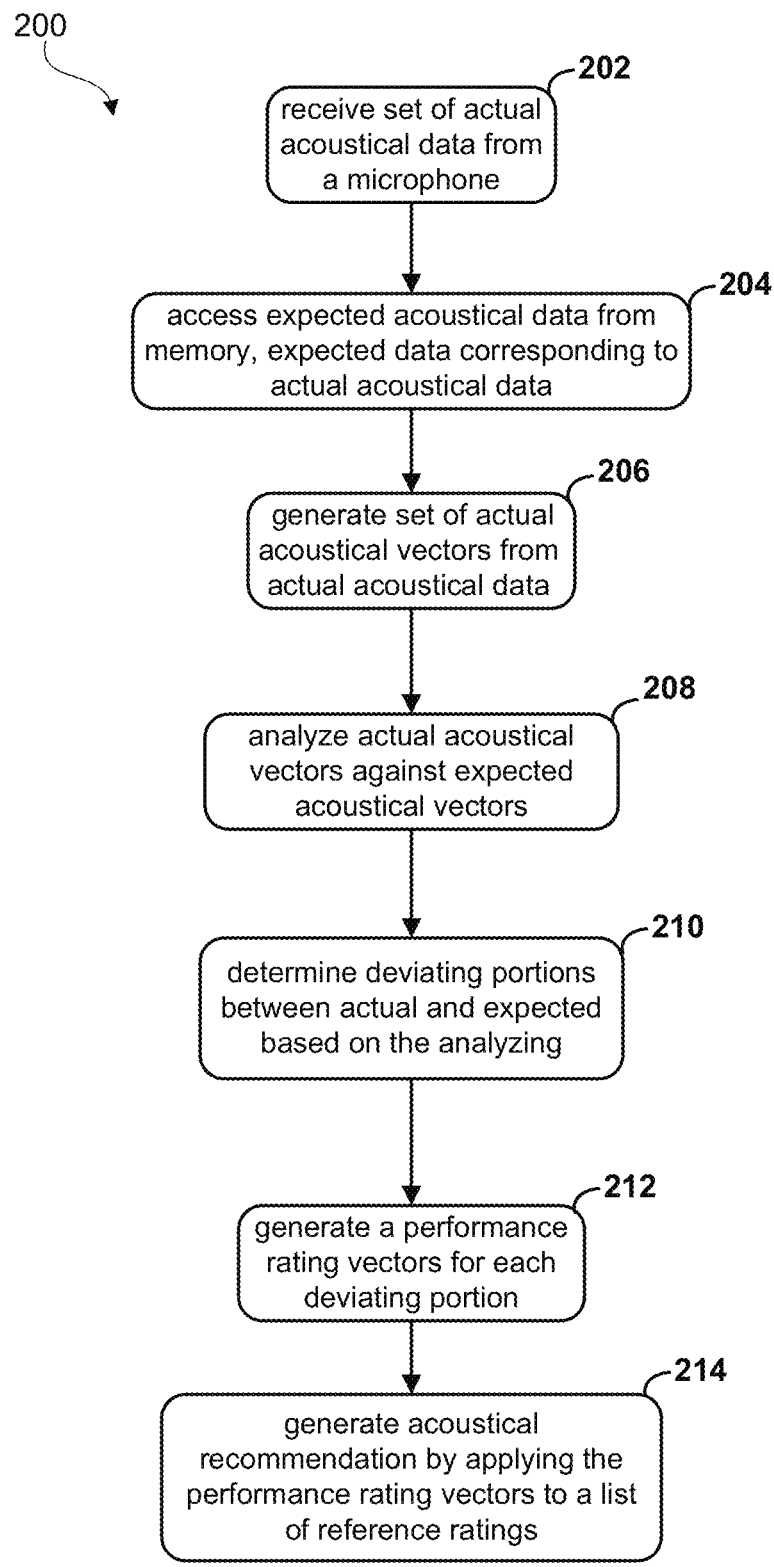
FIG. 2 depicts a diagram of an example flow of a method for analyzing acoustical data, according to embodiments.

FIG. 2 depicts a diagram of a method 200 for generating an acoustical recommendation based on actual acoustical data, according to embodiments. In embodiments, the method 200 may be executed in an example computing environment such as environment 100 of FIG. 1, and may be carried out over a computer processor, for example, computer system 501 of FIG. 5. The method 200 may begin when a computer system receives a set of actual acoustical data from a microphone. This is illustrated at step 202. In embodiments, the microphone may be communicatively coupled with the computer system (e.g., a wireless microphone), or it may be physically connected (e.g., a wired microphone like a USB microphone), or imbedded in the system (e.g., a laptop microphone or a microphone in a smart phone). The set of actual acoustical data may be, for example, a live practice session being recorded while a musician practices.

Based on the received actual acoustical data, the system may access a set of expected acoustical data from memory. The expected acoustical data may correspond to the actual acoustical data. This is illustrated at step 204. In embodiments, the expected acoustical data may be obtained from a variety of sources including, for example, recordings on the Internet, files from music streaming databases, translated sheet music (as described above, for example using a music composition software program), previous recordings by the musician providing the actual acoustical data, previously recorded and submitted practice sessions by other musicians, recorded performances, or other sources of acoustical data. In embodiments, this expected acoustical data may be received and scored by experts in the field. For example, an expert (e.g., a professor or a composer) of a particular piece, composition style, instrument, or other classification, may score one or more of the expected acoustical data sets (e.g., musical compositions), in order to maintain a high level of accuracy in the expected acoustical data.

In embodiments, the expected acoustical data may be identified as corresponding to the actual acoustical data based on an analysis of note composition, tempo, style, instrument, or other characteristics. In embodiments, a user may alternatively or additionally provide identification of the music to the system. For example, a user may indicate that the song to be played is of a particular title, composer, and arranger. The user could also provide the genre or artist or producer or other piece of identifying information to guide the system in identifying the corresponding expected acoustical data based on the actual acoustical data. In other embodiments, the user identification of the music being performed could override the system's matching capabilities, and the set of expected acoustical data could be selected based entirely on the identification of the piece by the user. In embodiments, the actual and expected acoustical data may be the same song, a portion of the same song, or correspond in another way.

Responsive to the receipt of actual acoustical data at step 202, the system may generate a set of actual acoustical vectors from the actual acoustical data. This is illustrated at step 206. In embodiments, each vector may describe a characteristic or set of characteristics of the acoustical data. For example, vectors generated may describe characteristics including: duration, pitch, dynamic (volume), or other characteristics, as well as changes or evolutions of each characteristic over time. Similarly, in embodiments, the system may generate a set of vectors based on the expected acoustical data. In embodiments, these vectors may be created at some earlier time and stored in memory (e.g., in memory as a profile with the expected acoustical data), or the set of vectors may be generated responsive to the accessing of the expected data, or at another time. In embodiments, some normalization may be required to more accurately determine correspondence between vectors describing the characteristics of the music. For example, dynamics of a particular musical passage may be slightly louder, but once normalized, may be considered a good fit. Similarly, tempo data may be normalized, when a player performs slightly over or under tempo for a particular duration.

In embodiments, the actual acoustical vectors may be analyzed against the expected acoustical vectors. This is illustrated at step 208. In embodiments, this analysis may occur by comparing the actual with the expected to identify deviating portions between the two sets of vectors. This is illustrated at step 210. In embodiments, the determining of deviating portions based on the analyzing. The system may then generate a performance rating vector for each deviating portion determined by the system. This is illustrated at step 212. In embodiments, each rating vector may comprise a series of points, with each point corresponding to a particular characteristic of the practice, passage, or piece (as represented by the set of actual and expected acoustical data). Each point on the vector may be a number between, for example, 0 and 5, which may correlate to a quality or variance between each of the characteristic vectors. In embodiments, and based on an application of the performance rating vectors to a list of reference ratings, a set of one or more acoustical recommendations may be generated. This is illustrated at step 214. In embodiments, the list of reference ratings may comprise a set of musical scores, segments of the particular set of expected acoustical data, or other data. The recommendations generated may also include a tempo indication (e.g., to instruct the musician to practice at a slower pace, or a gradually increasing pace), a repetition indication (e.g., to instruct the musician to drill a particular measure or set of measures a particular number of times), a preparatory indication (e.g., a set of scales or exercises to complete prior to beginning the music), or other recommendations, in addition to the portion of music provided.

In embodiments, the recommendation may be provided to the user via a user interface on a desktop computer system, a laptop, a smartphone, an electronic fitness device, or in another way. In embodiments, the recommendation may be provided to the user via a print out or an audible instruction. In embodiments, the method may loop back to step 202 and, responsive to the user practicing his instrument as directed in the recommendation, the system may receive the new set of acoustical data, and follow the method 200 to provide a new recommendation. In this way, the system may provide feedback to a user until the passage is mastered, as determined by, for example, accuracy of the measures (e.g., characteristics such as tempo and error rate).

Figure 3:
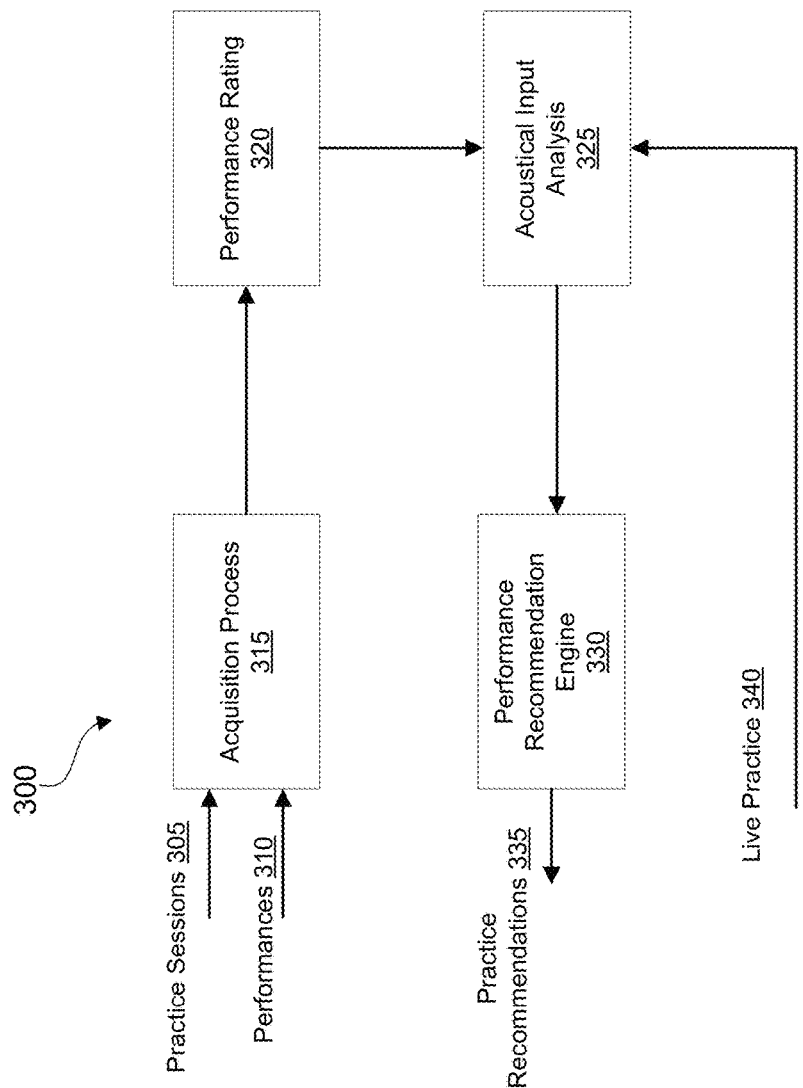
FIG. 3 depicts a diagram of an example flow of a method for generating an acoustical recommendation, according to embodiments

FIG. 3 depicts a diagram of an example flow of a method 300 for generating an acoustical recommendation, according to embodiments. In embodiments, the method 300 may be carried out over a computer system as described at FIGS. 1 and 6. In embodiments, an acquisition process 315 may begin when a computer system receives a set of practice sessions 305 and a set of performances 310. The acquisition process 315 may be used to prime or train the system. The system may receive the practice sessions 305 and performances 310 from any number of sources, as described, for example, at FIG. 1. The practice sessions 305 and performances 310 may be sourced from a set of musicians of various skill levels, from professions, amateurs, and peers. The acquired music (e.g., the practice sessions 305 and performances 310) may be rated based on a set of predetermined criteria, in order to identify the most accurate and more skilled performances. For example, the ratings may be based on note accuracy, fullness of sound and tone, tempo accuracy, style, or other predetermined factors. In embodiments, the performance rating 320 may be an automate process. In embodiments, one or more profiles may be established for each musician, in order to store the acquired music (e.g., practice sessions 305 and performances 310) along with the ratings for each musician. Live practice 340 may then be fed to the system (e.g., via a microphone and audio file as described herein), for acoustical input analysis 325. The input may be analyzed against a digital form of music in the acoustical input analysis 325. The analysis may be also stored in the profile for the musician. For example, as part of the acoustical input analysis 325, key passages of the musical selection that may be likely to require extra practice may be identified. The musical selections themselves may be identified from a variety of sources, described herein, including the musician profile or other data stored in memory or accessed from the Internet.

For example, in embodiments, as part of the acoustical input analysis 325 (e.g., which may analyze the live practice 340), the system may identify key passages that may require extra practice based off the data. While the exact analysis may vary in complexity, one example for ease of understanding may include to choose bars of the passage that appear in the top 20% for the piece for a given measurement (e.g., the top 20% of musical bars ranked by the number of errors they contain). For example, three measures may be used to evaluate a piece, including times a bar is practiced, tempo deviation during practice and cumulative errors (this is further described in FIG. 4).

Finally, based on the acoustical input analysis 325, a performance recommendation engine 330 may generate a practice recommendation 335. In embodiments, this recommendation may be generated as described at method 200 of FIG. 2. The recommendation may include one or more pieces of musical composition to practice, a set of exercises and/or drills, indications regarding tempo, changes in tempo, style, or other indications, and may include a single or series of recommendations. In embodiments, the user may incorporate the recommendations into his practice routine and submit the sessions as live practice 340, to be analyzed by the acoustical input analysis 325, and a new set of practice recommendations 335 may be generated for the user.

Figure 4:
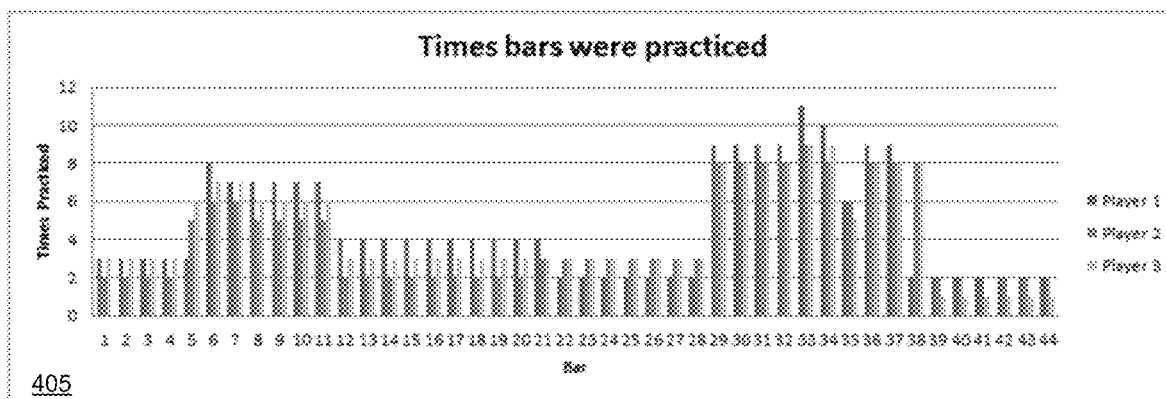
FIG. 4 illustrates three graphs illustrating example graphical representation of three users' actual acoustical vectors, according to some embodiments.
Figure 4:
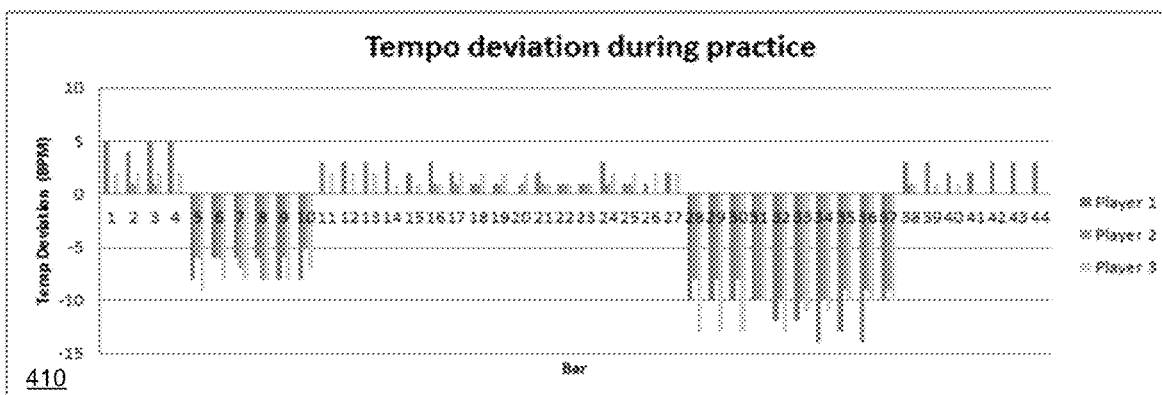
Figure 4:
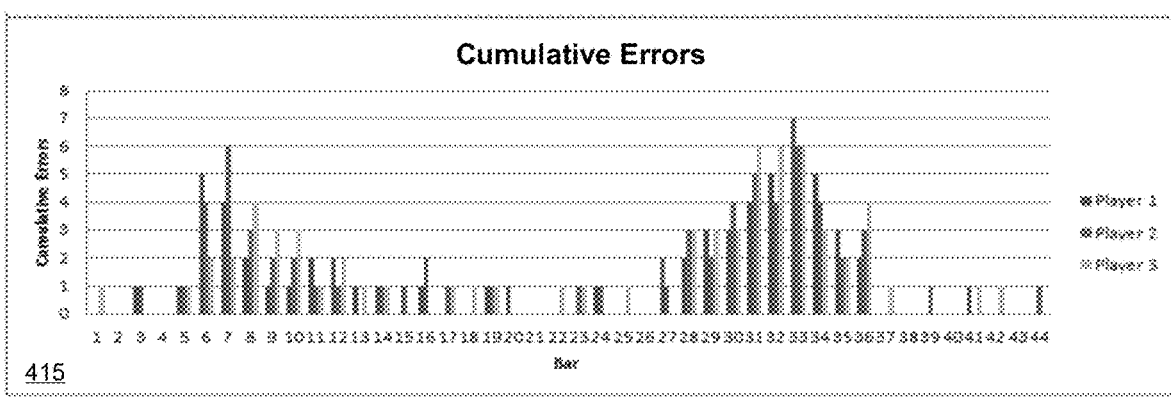

FIG. 4 depicts a set of charts 400 of example acoustical data, consistent with embodiments. For example, the charts 400 show example practice data that was captured for a set of three (e.g., the top three) performers over the first 46 bars of music. The first chart, 405, illustrates the number of times a particular bar was practiced. In practice, a musician may repeat a particular bar or group of bars if it is particularly challenging, until it is mastered. This may be known as "drilling". Each vertical bar on the chart 400 indicates a number of times a bar was practiced for each of a first player, a second player, and a third player. The second chart, 410, illustrates an average deviation from the marked tempo during practice, for each of the three players. In practice, a musician may slow down (decrease his tempo) of a particularly challenging portion of a composition. The third chart, 415, depicts a cumulative number of errors during practice for each of the three players. In practice, the overall difficulty of a piece may be reflected initially in the number of errors identified. Errors or deviations in the actual acoustical data input from the expected acoustical data may be detected based on one of any number of errors. For example, a musician playing an incorrect note can be an error. Missing a note, holding a note for an incorrect length of time, playing an extra note or other note accuracy related errors may be detected. Additionally, further errors could include playing at an incorrect tempo (e.g., too fast or too slow), skipping rests, or incorrect dynamics (e.g., playing too loudly, too softly, missing a crescendo, etc.). In embodiments, the characterization of particular musical attributes as errors may be modified according to user preference. Each chart represents an example key characteristic used in evaluating both performances (e.g., during performance rating 320 of FIG. 3), as well as in defining characteristic vectors for each of the musical pieces, as described herein.

For example, it has been shown that musicians who practice well and learn effectively repeatedly practice the difficult sections rather than repeatedly practice the whole piece end-to-end (e.g., as tracked by chart 405). Additionally, effective practice involves slowing down during difficult passage during practice, and then bringing them up to tempo (e.g., as charted in the tempo chart at 410). Finally, error rates may increase when attempting to play difficult passages (e.g., as charted at 415). Other measures of practice effectiveness could be tracked, including for example, dynamics.

In embodiments, the acoustical input analysis 325 of FIG. 3 may identify, based on the charts 400, that bars 6-7, 28-34 and 36-37 will require the most practice. Based on the analysis, the system may guide the musician to practice the key bars first, before playing the piece. In embodiments, a digital manuscript could be presented to the musician for bars 6-7 first, then bars 28-24, and 36-37. The system could then merge passages which are close, and therefore present bars 28-37 together (i.e., filling in bar 35). The system could provide practice tempos (e.g., via an audible or visible metronome indicator), with an instruction to start under tempo. In embodiments, more advanced recommendation could also analyze the music for key signatures, common progression (e.g., arpeggios, chromatics, scales, triplets, etc.), and recommend practice from other sources to improve general competency. For example, a system trained for comet or trumpet musicians could recommend sections from a particular comet method instruction book.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

In some embodiments, the modules 530 may include instructions that perform the steps of the process 200 shown in FIG. 2.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
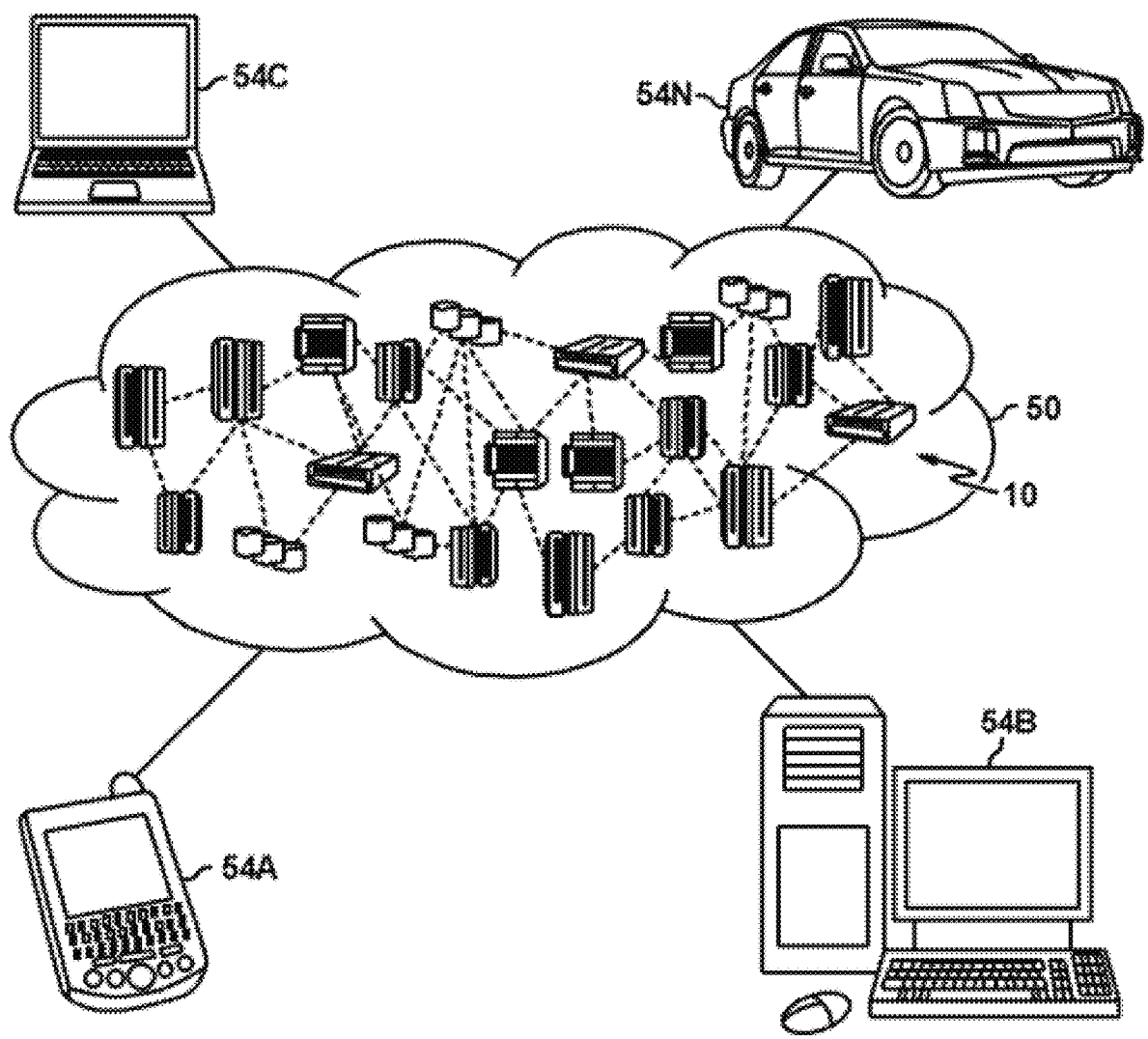
FIG. 6 depicts a cloud computing environment according to embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
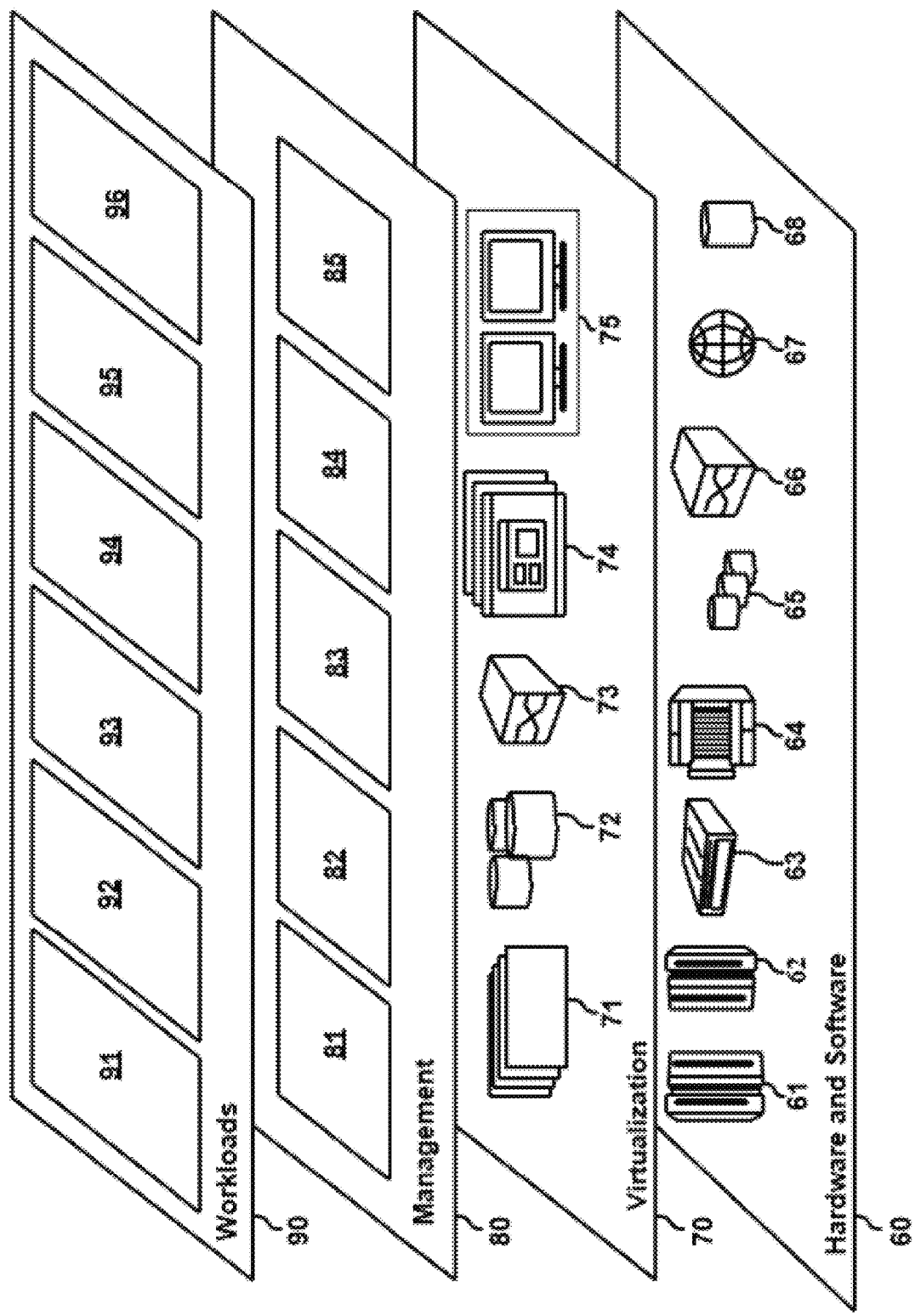
FIG. 7 depicts abstraction model layers according to embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generation of practice recommendations for a user 96.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for acoustical data analysis comprising:
   a memory having a set of computer readable instructions;
   a set of input devices for receiving acoustical data input; and
   at least one processor for executing the set of computer readable instructions, the set of computer readable instructions being configured to cause the processor to perform a method comprising:
   receiving, from an input device in the set of input devices, a set of actual acoustical data input;
   accessing, from the memory, a set of expected acoustical data, the set of expected acoustical data corresponding to the actual acoustical data input;
   generating, by the at least one processor, a set of actual acoustical vectors from the actual acoustical data input;
   analyzing, against a set of expected acoustical vectors, the set of actual acoustical vectors;
   determining, responsive to the analyzing, a set of deviating portions between the actual acoustical vectors and the expected acoustical vectors;
   generating, based on the set of deviating portions, a set of performance rating vectors for each deviating portion;
   generating, from the set of deviating portions and based on the set of performance rating vectors, one or more passages comprising selected bars of the expected acoustical data associated with a level of deviation from the actual acoustical vectors;
   generating, based on the performance rating vectors and by applying the performance rating vectors to a list of reference ratings, a set of acoustical recommendations; and
   presenting the one or more passages and one or more acoustical recommendations of the set of acoustical recommendations, the one or more acoustical recommendations associated with the one or more passages.

2. The system of claim 1, wherein the method further comprises generating, for the set of expected acoustical data, the set of expected acoustical vectors.

3. The system of claim 1, wherein the actual acoustical vectors describe characteristics of the data including tempo.

4. The system of claim 1, wherein the method further comprises:
   receiving, by the one or more processors, a first set of audio data, wherein the first set of audio data is obtained from an Internet music database;
   receiving, by the one or more processors, a second set of audio data, wherein the second set of audio data is provided by a musical composition application;
   determining the first set of audio data and the second set of audio data correlate to a same musical composition; and
   storing, in a profile, as the set of the expected acoustical data, the first and second sets of audio data.

5. The system of claim 1, wherein the set of acoustical recommendations comprises an instruction to play a particular musical composition, wherein the particular musical composition does not correspond to the expected acoustical data.

6. The system of claim 1, wherein the set of acoustical recommendations comprises an instruction to perform a piece at a slower tempo.

7. A method comprising:
   receiving, from an input device in the set of input devices, a set of actual acoustical data input;
   accessing, from a memory, a set of expected acoustical data, the set of expected acoustical data corresponding to the actual acoustical data input;
   generating, by at least one processor, a set of actual acoustical vectors from the actual acoustical data input;
   analyzing, against a set of expected acoustical vectors, the set of actual acoustical vectors;
   determining, responsive to the analyzing, a set of deviating portions between the actual acoustical vectors and the expected acoustical vectors;
   generating, based on the set of deviating portions, a set of performance rating vectors for each deviating portion; and
   generating, from the set of deviating portions and based on the set of performance rating vectors, one or more passages comprising selected bars of the expected acoustical data associated with a level of deviation from the actual acoustical vectors;

generating, based on the performance rating vectors and by applying the performance rating vectors to a list of reference ratings, a set of acoustical recommendations; and presenting the one or more passages and one or more acoustical recommendations of the set of acoustical recommendations, the one or more acoustical recommendations associated with the one or more passages.

8. The method of claim 7, further comprising generating, for the set of expected acoustical data, the set of expected acoustical vectors.

9. The method of claim 7, wherein the actual acoustical vectors describe characteristics of the data including tempo.

10. The method of claim 7, further comprising:
receiving, by the one or more processors, a first set of audio data, wherein the first set of audio data is obtained from an Internet music database;
receiving, by the one or more processors, a second set of audio data, wherein the second set of audio data is provided by a musical composition application;
determining the first set of audio data and the second set of audio data correlate to a same musical composition; and
storing, in a profile, as the set of the expected acoustical data, the first and second sets of audio data.

11. The method of claim 7, wherein the set of acoustical recommendations comprises an instruction to play a different musical composition, wherein subsequent expected acoustical data associated with the different musical composition does not correspond to the expected acoustical data.

12. The method of claim 7, wherein the set of acoustical recommendations comprises an instruction to perform a piece at a slower tempo.

13. The method of claim 7, further comprising identifying the set of expected acoustical data based on the received set of actual acoustical data, wherein accessing the set of expected acoustical data occurs in response to the identifying.

14. The method of claim 13, wherein the identifying is based on analysis of note composition of the set of actual acoustical data.

15. The method of claim 7, wherein the expected acoustical vectors include data describing characteristics including tempo, tone, cadence, and volume dynamics.

16. The method of claim 7, wherein the set of actual acoustical vectors includes data describing characteristics including duration, pitch, and volume, and wherein the set of actual acoustical vectors further includes data about the changes in each of the characteristics over time.

17. The method of claim 7, wherein each of the performance rating vectors comprises a series of points, each of the series of points corresponding to a particular characteristic of a passage as represented by the set of actual acoustical data and the set of expected acoustical data.

18. A computer program product comprising a computer readable storage medium having program instructions embodied therewith, wherein the computer readable storage medium is not a transitory signal per se, the program instructions executable by a processor to cause the processor to perform a method comprising:

receiving, from an input device in the set of input devices, a set of actual acoustical data input;

accessing, from a memory, a set of expected acoustical data, the set of expected acoustical data corresponding to the actual acoustical data input;

generating, a set of actual acoustical vectors from the actual acoustical data input;

analyzing, against a set of expected acoustical vectors, the set of actual acoustical vectors;

determining, responsive to the analyzing, a set of deviating portions between the actual acoustical vectors and the expected acoustical vectors;

generating, based on the set of deviating portions, a set of performance rating vectors for each deviating portion;

generating, from the set of deviating portions and based on the set of performance rating vectors, one or more passages comprising selected bars of the expected acoustical data associated with a level of deviation from the actual acoustical vectors;

generating, based on the performance rating vectors and by applying the performance rating vectors to a list of reference ratings, a set of acoustical recommendations; and presenting the one or more passages and one or more acoustical recommendations of the set of acoustical recommendations, the one or more acoustical recommendations associated with the one or more passages.

19. The computer program product of claim 18, wherein the set of acoustical recommendations comprises an instruction to perform a piece at a slower tempo.

* * * * *